US010892078B2

(12) United States Patent
Simon et al.

(10) Patent No.: US 10,892,078 B2
(45) Date of Patent: Jan. 12, 2021

(54) ELECTRIC ACTUATOR

(71) Applicant: MTS SYSTEMS CORPORATION, Eden Prairie, MN (US)

(72) Inventors: Andrew Gregory Simon, Jordan, MN (US); Andrew Timothy Reiner, St. Louis Park, MN (US); Paul Martin Krueger, Maple Grove, MN (US); Bradley Dean Schulz, Minneapolis, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 151 days.

(21) Appl. No.: 15/835,201

(22) Filed: Dec. 7, 2017

(65) Prior Publication Data
US 2018/0166196 A1 Jun. 14, 2018

Related U.S. Application Data

(60) Provisional application No. 62/431,312, filed on Dec. 7, 2016, provisional application No. 62/431,311, filed on Dec. 7, 2016.

(51) Int. Cl.
*H02K 16/00* (2006.01)
*H01F 7/16* (2006.01)
(Continued)

(52) U.S. Cl.
CPC ........... *H01F 7/1615* (2013.01); *F16C 17/10* (2013.01); *F16C 27/08* (2013.01); *H01F 7/081* (2013.01);
(Continued)

(58) Field of Classification Search
CPC ........ H02K 16/00; H02K 41/00–41/41; H02K 2201/18
See application file for complete search history.

(56) References Cited

U.S. PATENT DOCUMENTS 2,263,297 A  11/1941 Grover et al.
5,051,635 A   9/1991 Kasahara
(Continued)

FOREIGN PATENT DOCUMENTS

CN      1756639 A    4/2006
CN    101640468 A    2/2010
(Continued)

OTHER PUBLICATIONS

International Search Report dated dated Dec. 17, 2009 for corresponding International Application No. PCT/IB2009/050911, filed Mar. 5, 2009.
(Continued)

*Primary Examiner* — Ramon M Barrera
(74) *Attorney, Agent, or Firm* — Steven M. Koehler; Westman, Champlin & Koehler, P.A.

(57) ABSTRACT

An electric actuator assembly having a support housing, a first stator magnetic field generating assembly secured to the support housing and a movable armature assembly. The movable armature assembly includes a plate assembly having a center support. The electric actuator assembly also includes a first armature magnetic field generating assembly configured to provide magnetic fields operative with a first stator magnetic field generating assembly to provide linear motion of the movable armature assembly along a reference axis, the first armature magnetic field generating assembly including first and second magnetic assemblies secured to opposite sides of the center support. In another embodiment, the electric linear actuator includes a rotational component coupled to a linear component to move therewith. The rotational component includes an armature magnetic field generating assembly being one of longer or shorter than a stator magnetic field generating assembly.

17 Claims, 14 Drawing Sheets

(51) Int. Cl.
*H02K 41/03* (2006.01)
*H01F 7/08* (2006.01)
*F16C 27/08* (2006.01)
*H02K 5/167* (2006.01)
*F16C 17/10* (2006.01)
*H01F 7/18* (2006.01)

(52) U.S. Cl.
CPC ........... *H02K 5/1672* (2013.01); *H02K 16/00* (2013.01); *H02K 41/03* (2013.01); *H02K 41/031* (2013.01); *H01F 2007/185* (2013.01); *H02K 2201/18* (2013.01); *H02K 2207/03* (2013.01)

(56) References Cited

U.S. PATENT DOCUMENTS

| | | | |
|---|---|---|---|
| 5,100,271 | A | 3/1992 | Kameyama et al. |
| 5,661,446 | A | 8/1997 | Anderson et al. |
| 5,959,373 | A | 9/1999 | Cho |
| 5,959,374 | A | 9/1999 | Anderson et al. |
| 5,959,382 | A | 9/1999 | Dauwalter |
| 5,990,583 | A | 11/1999 | Nanba et al. |
| 5,990,587 | A | 11/1999 | Shimanovich et al. |
| 6,008,552 | A | 12/1999 | Yagoto et al. |
| 6,012,208 | A | 1/2000 | Wiemers |
| 6,016,039 | A | 1/2000 | Neff et al. |
| 6,051,896 | A | 4/2000 | Shibuya et al. |
| 6,075,298 | A | 6/2000 | Maue et al. |
| 6,081,050 | A | 6/2000 | Hong et al. |
| 6,081,051 | A | 6/2000 | Kitazawa et al. |
| 6,189,576 | B1 | 2/2001 | Markward |
| 6,204,585 | B1 | 3/2001 | Riello et al. |
| 6,215,206 | B1 | 4/2001 | Chitayat |
| 6,222,294 | B1 | 4/2001 | Stacy et al. |
| 6,280,124 | B1 | 8/2001 | Ammann |
| 6,362,547 | B1 | 3/2002 | Peterson et al. |
| 6,371,221 | B1 | 4/2002 | Harrigan et al. |
| 6,376,940 | B1 | 4/2002 | Shibuya et al. |
| 6,389,876 | B1 | 5/2002 | Tanimura et al. |
| 6,429,611 | B1 | 8/2002 | Li |
| 6,433,447 | B1 | 8/2002 | Kitazawa et al. |
| 6,518,682 | B2 | 2/2003 | Weaver et al. |
| 7,276,820 | B2 | 10/2007 | Tang et al. |
| 7,401,520 | B2 | 7/2008 | Parison |
| 7,404,334 | B2 | 7/2008 | Saari et al. |
| 7,442,022 | B2 | 10/2008 | Konno et al. |
| 7,501,724 | B2 | 3/2009 | Tang et al. |
| 8,393,225 | B2 | 3/2013 | Hayford et al. |
| 9,071,122 | B2 | 6/2015 | Neufeld et al. |
| 2005/0046282 | A1 | 3/2005 | Tang et al. |
| 2006/0147578 | A1 | 7/2006 | Konno |
| 2007/0296282 | A1 | 12/2007 | Tang et al. |
| 2009/0017151 | A1 | 1/2009 | Konno et al. |
| 2009/0295236 | A1 | 12/2009 | Bott et al. |
| 2011/0005328 | A1 | 1/2011 | Hayford et al. |
| 2012/0017539 | A1 | 1/2012 | Neufeld et al. |

FOREIGN PATENT DOCUMENTS

| | | |
|---|---|---|
| CN | 101997389 A | 3/2011 |
| CN | 102123833 A | 7/2011 |
| CN | 102640399 A | 8/2012 |
| CN | 102780380 A | 11/2012 |
| CN | 101971464 B | 12/2013 |
| CN | 103795220 A | 5/2014 |
| CN | 104467268 A | 3/2015 |
| DE | 2906404 A1 | 8/1980 |
| DE | 202006019032 U1 | 3/2007 |
| DE | 102008037707 A1 | 2/2010 |
| EP | 1511163 A2 | 3/2005 |
| EP | 1607205 A1 | 12/2005 |
| EP | 2263297 A1 | 12/2010 |
| GB | 2097197 A | 10/1982 |
| GB | 2218268 A | 11/1989 |
| JP | 2002071809 A | 3/2002 |
| JP | 2011514132 A | 4/2011 |
| JP | 2015102743 A | 6/2015 |
| KR | 20100134568 A | 12/2010 |
| WO | 2004058448 A2 | 7/2004 |
| WO | 2009109935 A2 | 9/2009 |

OTHER PUBLICATIONS

International Search Report dated Mar. 26, 2018 for corresponding International Application PCT/US2017/06510, filed Dec. 7, 2017.
Office Action received for corresponding Korean Patent Application No. 10-2019-7018865, dated Oct. 7, 2020.
Chinese Office Action from the Chinese Patent Office for Chinese patent application No. 201780075408.7, dated Oct. 19, 2020.

ELECTRIC ACTUATOR

CROSS-REFERENCE TO RELATED APPLICATION

The present application is based on and claims the benefit of U.S. provisional patent application Ser. Nos. 62/431,311 and 62/431,312, both filed Dec. 7, 2016, the contents of which are hereby incorporated by reference in its entirety.

BACKGROUND

The discussion below is merely provided for general background information and is not intended to be used as an aid in the scope of the subject matter.

Aspects herein disclosed relate to actuators and particularly to a construction of an electromagnetic actuator which requires application of linear force in possible combination with providing a torque. A particular advantageous use of such an actuator is in a test machine or apparatus used to test parameters and/or performance of materials, components, consumer products as well as medical and other devices (i.e. test specimens). Typically, test machines include one or more actuators to apply input loads and displacement.

SUMMARY

One general aspect includes an electric actuator having first and second stator magnetic field generating assemblies secured to the support housing. A movable armature assembly is disposed in the support housing and includes a first armature magnetic field generating assembly configured to provide magnetic fields operative with the first stator magnetic field generating assembly to provide linear motion of the movable armature assembly along a reference axis and a second armature magnetic field generating assembly configured to provide magnetic fields operative with the second stator magnetic field generating assembly to provide rotational motion of at least a portion of the movable armature assembly. The second armature magnetic field generating assembly is either longer or shorter than the second stator magnetic field generating assembly.

Implementations may include one or more of the following features. The magnetic field generating assemblies can be formed with windings or magnets: in particular, where the first stator magnetic field generating assembly includes windings, where the first armature magnetic field generating assembly includes permanent magnets; where the second stator magnetic field generating assembly includes windings; where the second armature magnetic field generating assembly includes windings.

The first armature magnetic field generating assembly can have a cylindrical or planer shape. The electric actuator assembly can include bearings rotatably coupling the second armature magnetic field generating assembly to the first armature magnetic field generating assembly. The bearings can include a thrust bearing spaced apart from an additional bearing configured to react lateral loads; an angular contact bearing; and or a tapered bearing.

In one embodiment, the electric actuator assembly is configured where the first armature magnetic field generating assembly includes a center support and first and second magnetic assemblies are secured to opposite sides of the center support. If desired, the center support can be made of material softer than the first and second magnetic assemblies. In one embodiment, the second armature magnetic field generating assembly is secured to the center support with a fastener, where the second armature magnetic field generating assembly is spaced apart from the center support so as to bear against the first and second magnetic assemblies. In another embodiment, the shaft extends within a bore extending along a longitudinal length of the first armature magnetic field generating assembly. The electric actuator assembly can include an end member secured to the center support with a fastener, where the end member is spaced apart from the center support so as to bear against the first and second magnetic assemblies In yet another embodiment, the bearings support the second armature magnetic field generating assembly on a shaft extending at least partially into the first armature magnetic field generating assembly, whereas in another embodiment, the shaft extends within a bore extending along a longitudinal length of the first armature magnetic field generating assembly.

Another general aspect includes an electric actuator assembly having a support housing, a first stator magnetic field generating assembly secured to the support housing and a movable armature assembly. The movable armature assembly includes a plate assembly having a center support. The electric actuator assembly also includes a first armature magnetic field generating assembly configured to provide magnetic fields operative with a first stator magnetic field generating assembly to provide linear motion of the movable armature assembly along a reference axis, the first armature magnetic field generating assembly including first and second magnetic assemblies secured to opposite sides of the center support.

Implementations may include one or more of the following features. The electric actuator assembly where the center support is made of material softer than the first and second magnetic assemblies. The electric actuator assembly and including an end member secured to the center support with a fastener, where the end member is spaced apart from the center support so as to bear against the first and second magnetic assemblies.

DETAILED DESCRIPTION OF ILLUSTRATIVE EMBODIMENTS

Figure 1:
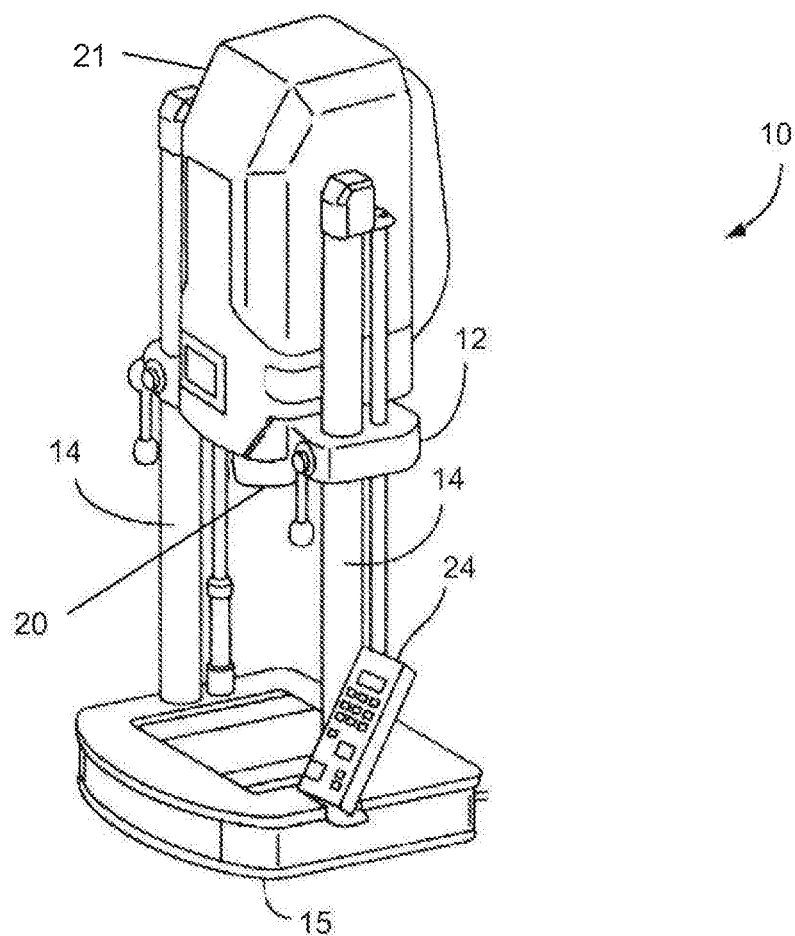
FIG. 1 is a perspective view of an exemplary testing machine having an actuator herein disclosed.
Figure 1A:
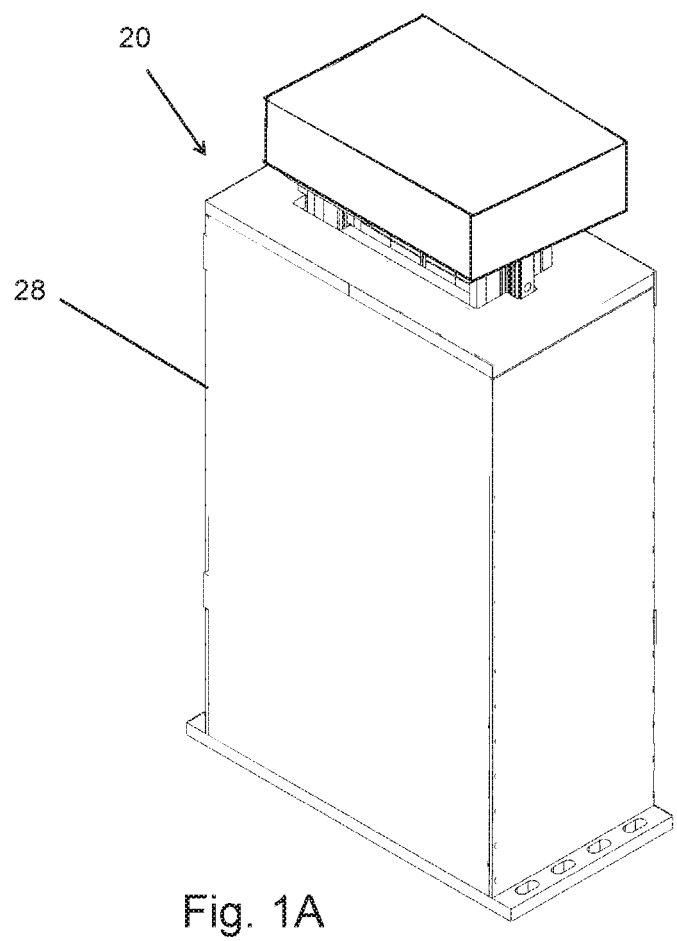
FIG. 1A is a perspective view of an actuator with a different operating configuration.

The present disclosure provides an electric actuator capable of linear and/or rotary displacement. The actuator can be used for many different applications. In one non-limiting but advantageous embodiment, the electric actuator is provided in a testing machine 10 illustrated in FIG. 1. Generally, the testing machine 10 includes a crosshead 12 that is moveable on vertical columns 14 by a crosshead drive (motor, gear reducer, drive belts, etc.) not shown, where the columns 14 in turn are supported by a base 15. An electric actuator 20 having aspects herein described is mounted to the crosshead 12 for movement on the vertical columns 14. A housing 21 surrounds the electric actuator 20 and is also mounted to the crosshead 12 to move therewith. A user interface 24 is provided to control the electric actuator 20 and the testing machine 10 at least in part although commonly, the testing machine 10 further includes a computing device that generates a graphical user interface (GUI) through which the user can further control the testing machine 10. In an alternative embodiment, the testing machine 10 can be of size to be supported by a table top. In FIG. 1 the actuator 20 has a lower end to which an object such as a test specimen is operatively coupled. In FIG. 1A, the actuator 20 has an upper end to which the object is operatively coupled. It should be understood, the actuator 20 can be oriented as needed given the application in which it is used. As appreciated by those skilled in the art, components of the electric actuator 20 can be of size as necessary to impart the desired loads.

Figure 2A:
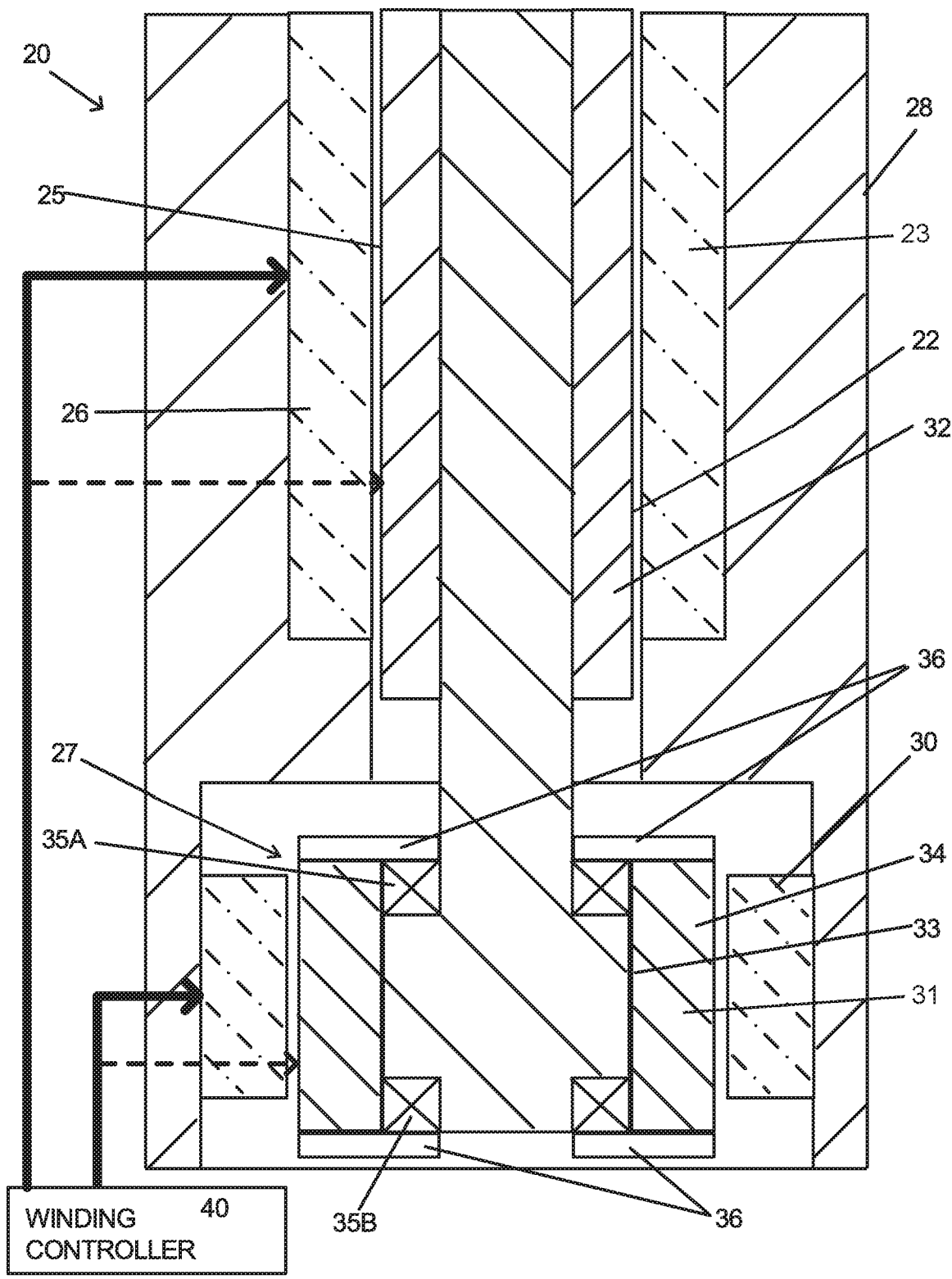
FIG. 2A is a schematic section view of a first actuator.
Figure 2B:
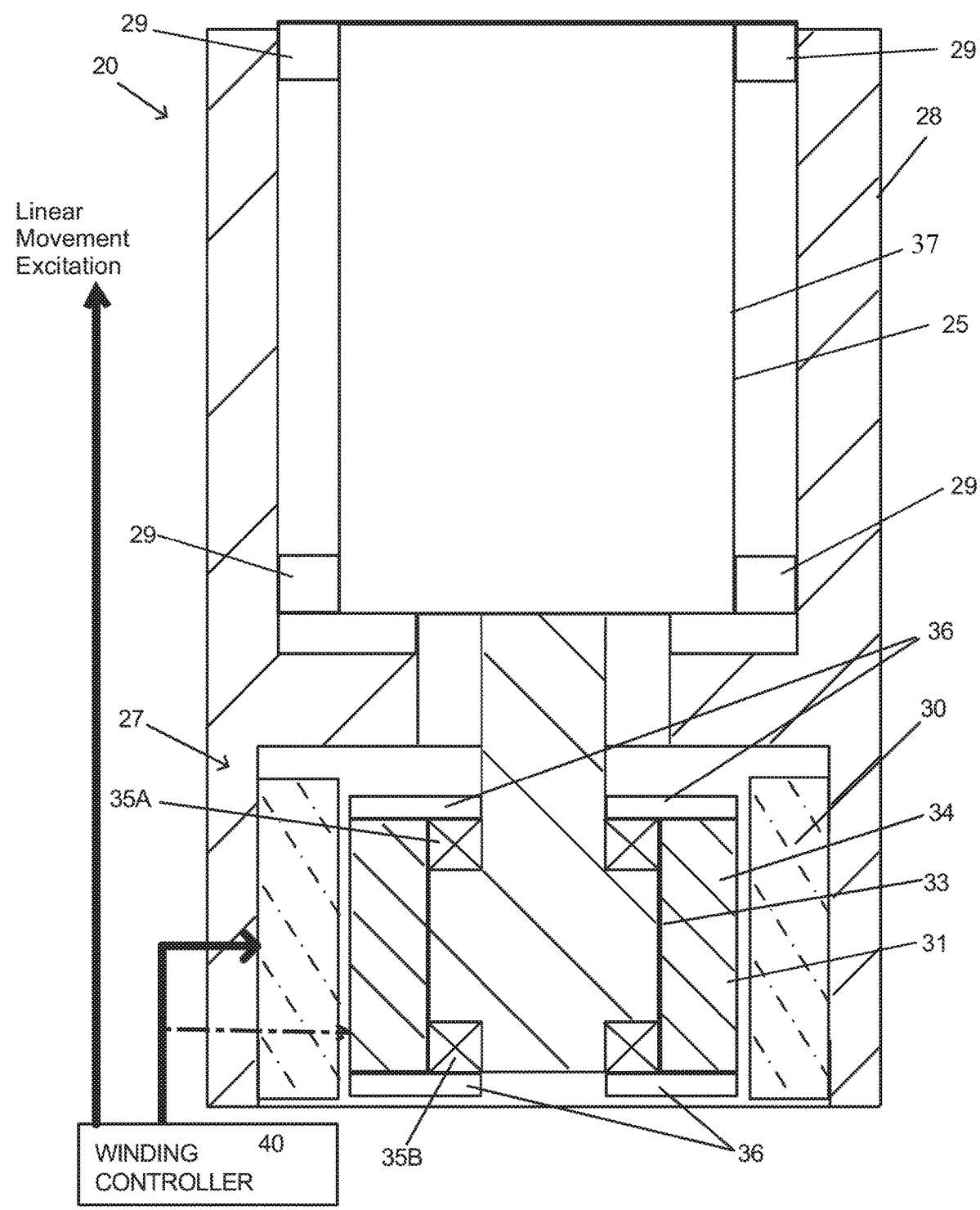
FIG. 2B is a schematic section view of a second actuator.

FIGS. 2A and 2B schematically illustrate embodiments of the electric actuator 20 having a linear motion component 25 and a rotational or torsional motion component 27. In the schematic illustration of FIG. 2A, the electric actuator 20 includes a movable armature assembly 22 having a first armature magnetic field generating assembly 23 secured thereto with magnetic fields with alternating polarity suitable for operation as a linear motor. A first stator magnetic field generating assembly 26 is secured to a support housing 28 that can be, for example, secured to the crosshead 12 illustrated in FIG. 1, or any other base or fixture depending on the manner in which the actuator 20 is used.

At an end of the armature assembly 22, herein a lower end, the rotational or torsional motion component 27 is located. The rotational or torsional motion component 27 includes a rotatable (partial and/or complete rotation) as well as linearly movable armature 34 having a second armature magnetic field generating assembly 31 secured thereto with magnetic fields with alternating polarity suitable for operation as a rotational motor and a second stator magnetic field generating assembly 30 secured to the support housing 28. The rotatable armature 34 rotates about a center support shaft 33 on bearing assemblies 35A, 35B. In the schematic illustrated embodiment, support plates 36 schematically illustrate a support structure couplable to the bearings 35A, 35B to allow the armature 34 to rotate about the support shaft 33.

A winding controller 40 energizes at least one of the first armature magnetic field generating assembly on the armature 22 and first stator magnetic field generating assembly 26, as well as at least one of the second armature magnetic field generating assembly 31 on the armature 34 and the second stator magnetic field generating assembly 30, where each energized magnetic field generating assembly accordingly comprises windings in a configuration suitable for generating magnetic poles in a desired pattern suitable for operation as a linear or a rotatory motor. For instance, in one embodiment, the winding controller 40 can energize windings of the first stator magnetic field generating assembly 26 and the second stator magnetic field generating assembly 30, where the first armature magnetic field generating assembly 23 on the armature 22 and the second armature magnetic field generating assembly 31 on the armature 34 can comprise permanent magnets. Likewise, in alternative embodiments, one or both of the armature magnetic field generating assemblies can comprise windings that are energized by the winding controller 40, while one or both of the stator magnetic field generating assemblies comprise magnets. If one or both of the armature magnetic field generating assemblies comprise windings suitable contacts are provided to allow energization in the presence of movement of each respective armature. By way of example only, if the first stator magnetic field generating assembly 26 and the second stator magnetic field generating assembly 30 each comprise windings, the winding controller 40 energizes one or more stator windings 26 of the linear motion component 25 and the one or more stator windings 30 of the rotational or torsional motion component 27 so as to achieve the desired motion of the armature assembly 22 relative to the support housing 28. In particular, controlled excitation of one or more stator windings 26 of the linear motion component 25 will cause axial displacement of the actuator assembly 22, and in particular, the rotatable armature 34 (up and down in the illustration of FIGS. 2A and 2B). If it is also desirable to cause rotation of the rotatable armature 34, the winding controller 40 energizes one or more stator windings 30 so as to cause the armature 34 to rotate about the support shaft 33.

Referring to either of FIGS. 2A and 2B, the second armature magnetic field generating assembly 31 on the armature 34 and second stator magnetic field generating assembly 30 are of different axial lengths. This construction allows magnetic fields of the armature 34 and the stator 30 to interact and thereby cause rotation of the armature 34 even though the axial position of the armature 34 is displaced by the linear motion component 25. In FIG. 2A, the second armature magnetic field generating assembly 31 on the armature 34 is axially longer than the second stator magnetic field generating assembly 30, while in FIG. 2B, the second armature magnetic field generating assembly 31 on the armature 34 is axially shorter than the second stator magnetic field generating assembly 30. In one advantageous embodiment of the type illustrated in FIG. 2A, the second armature magnetic field generating assembly 31 on the armature 34 comprises magnets, while the second stator magnetic field generating assembly 30 comprises windings. This embodiment is advantageous because costs are generally lower due to the lesser amount of windings in the embodiment of FIG. 2A than a similarly configured embodiment of FIG. 2B.

It should also be noted that the shape of the armature in the linear motion component 25 can be tubular as represented by FIG. 2A or can be in the form of a movable plate illustrated in FIG. 2B. The armature of the linear motion component 25 is guided for example by linear guides schematically indicated at 29. In the embodiment of FIG. 2B, the first armature magnetic field generating assembly on the armature and the first stator magnetic field generating assembly are not shown due to the schematic sectional view provided. The first armature magnetic field generating assembly would be mounted to plate members 37 (one of which is illustrated) on opposite sides of the linear guides 29.

Figure 3:
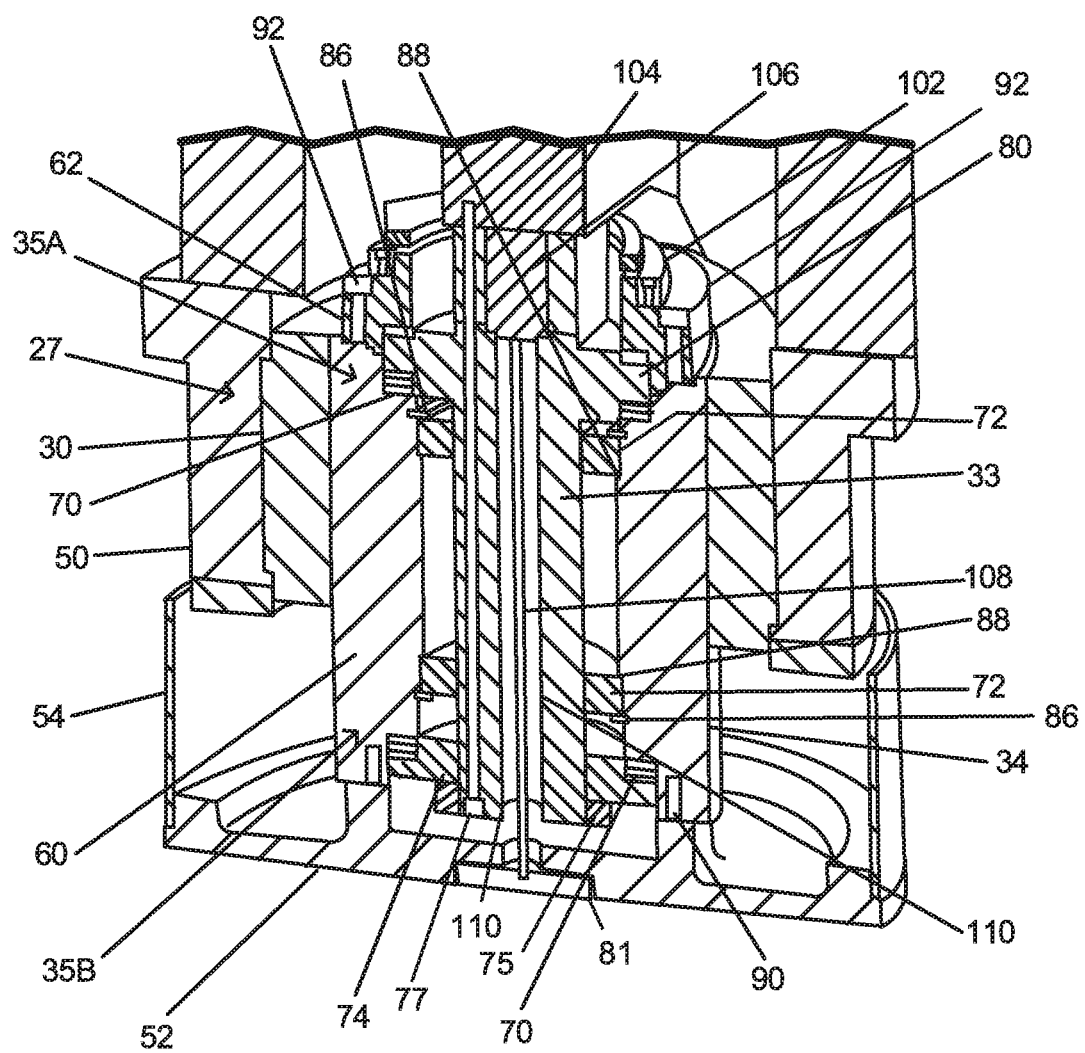
FIG. 3 is a perspective sectional view of an embodiment of the first actuator.

FIG. 3 is a sectional view of an exemplary rotatable or torsional motion component 27 constructed in a manner similar to that schematically illustrated in FIG. 2A. The rotatable or torsional motion component 27 includes a support collar 50 secured to or formed integral with the crosshead 12 as a single unitary body. The support collar 50 supports the second stator magnetic field generating assembly 30. The armature 34 includes an end mounting plate or member 52 through which forces are applied, for example, to a test specimen. In the embodiment illustrated, the end member 52 includes a cylindrical wall 54 of sufficient diameter so as to overlap the support collar 50 for various linear positions of the armature 34 relative to the second stator magnetic field generating assembly 30, in one embodiment comprising windings. The cylindrical wall 54 inhibits contaminants or other debris from contact with the armature 34.

The end member 52 is secured to one end of a cylindrical support GO for the second armature magnetic field generating assembly on the armature 34, in one embodiment comprising individual magnets bonded thereto. At an end opposite the end member 52, an upper mounting ring 62 is secured to the cylindrical support 60 of the armature 34. The support shaft 33 extends through the armature 34 where bearing assemblies generally indicated at 35A, 35B mounted thereto allow the cylindrical support 60 of the armature 34 to rotate relative to the support shaft 33. In this embodiment, each bearing assembly 35A, 35B comprises an axial thrust bearing 70 configured to transmit axial forces through the support shaft 33 and the cylindrical support 60 of the armature 34. The axial thrust bearing 70 can, for example, comprise a needle bearing assembly. The thrust bearing 70 is operably coupled between the cylindrical support 60 and a support plate 74. A fastener such as a nut 75 engages threads provided on the support shaft 33 and holds the armature assembly together.

On an upper end of the armature 34, the thrust bearing 70 is operably coupled between the cylindrical support 60 and an annular shoulder 80 provided on the support shaft 33. In view that the thrust bearings 70 are not generally suitable for carrying lateral loads that are orthogonal to the axis of rotation, additional bearing assemblies 72 suitable for reacting such lateral loads are also provided. For example and without limitation, the additional bearing assemblies 72 can comprise roller bearings. Inner races of the additional bearings 72 are secured to the support shaft 33 while outer races are secured to the cylindrical support 60 herein using by way of example retainer rings 86 that secure the outer races against annular flanges 88 of the cylindrical support 60.

Preferably, components of the rotational or torsional motion component 27 are pre-loaded in an axial direction in an amount greater than the maximum axial load to be applied by the actuator 20, for example to the test specimen, from the linear motion component 25. In this manner, precise linear positioning of the armature assembly 22, armature 34 and end member 52 can be maintained. In the embodiment illustrated, fasteners 90 (portions of which are shown) secure the end member 52 to an end of the cylindrical support 60, while fasteners 92, similar to fasteners 90, secure the mounting ring 62 to the cylindrical support 60 on an end opposite the end member 52. Likewise, the nut 75 preloads the thrust bearings 70 so as to exceed the axial forces applied by the actuator 20. In the embodiment illustrated, fasteners, one of which is illustrated at 77, mount the support shaft 33 to an end 104 of the linear motion armature.

A rotational sensor is operably configured so as to provide an output signal indicative of rotation of the armature 34. The rotational sensor can take many forms. In the embodiment illustrated, an encoder is illustrated where an encoder ring 102 having positional markings is mounted to and rotates with the mounting ring 62. A sensing component of the encoder, not shown, is suitably mounted so as to sense movement of the encoder ring 102. If desired, or in the alternative, an analog resolver can be provided to measure absolute rotational position of the armature 34. In the embodiment illustrated, the resolver includes a stationary component 106 mounted in a cavity provided in the support shaft 33 while a rotatable element 108 extends through a bore 110 provided in the support shaft 33 and is secured herein to end member 52 with a fastener 81 so that the rotatable element 108 rotates with rotation of the armature 34. Each of the rotational sensors illustrated move linearly with the armature 34. In another embodiment, rather than be located as illustrated, if desired, the rotational sensors can be mounted to the armature 34 at its end.

Figure 4:
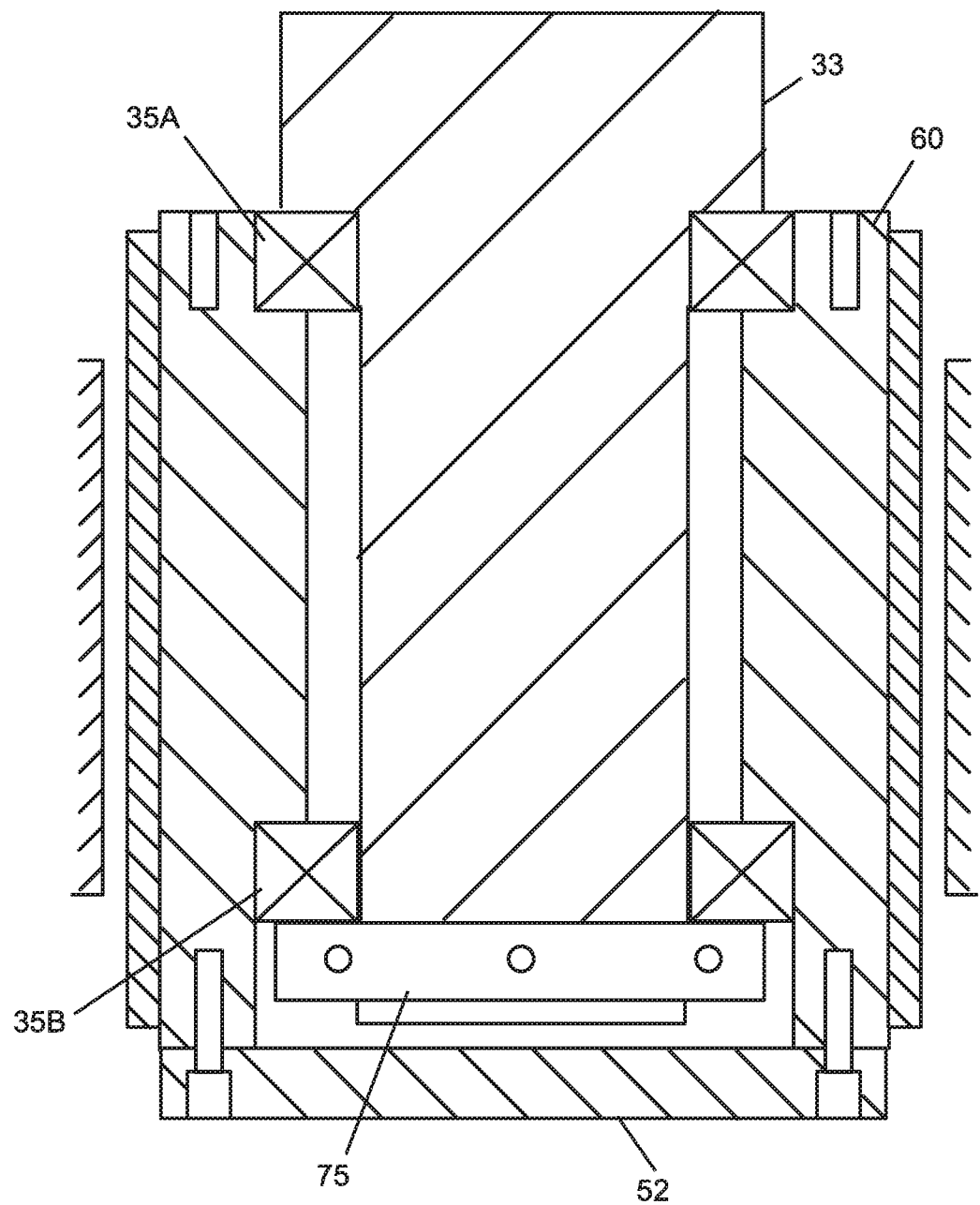
FIG. 4 is a schematic section view of a rotating component of an actuator having a first bearing configuration.
Figure 5:
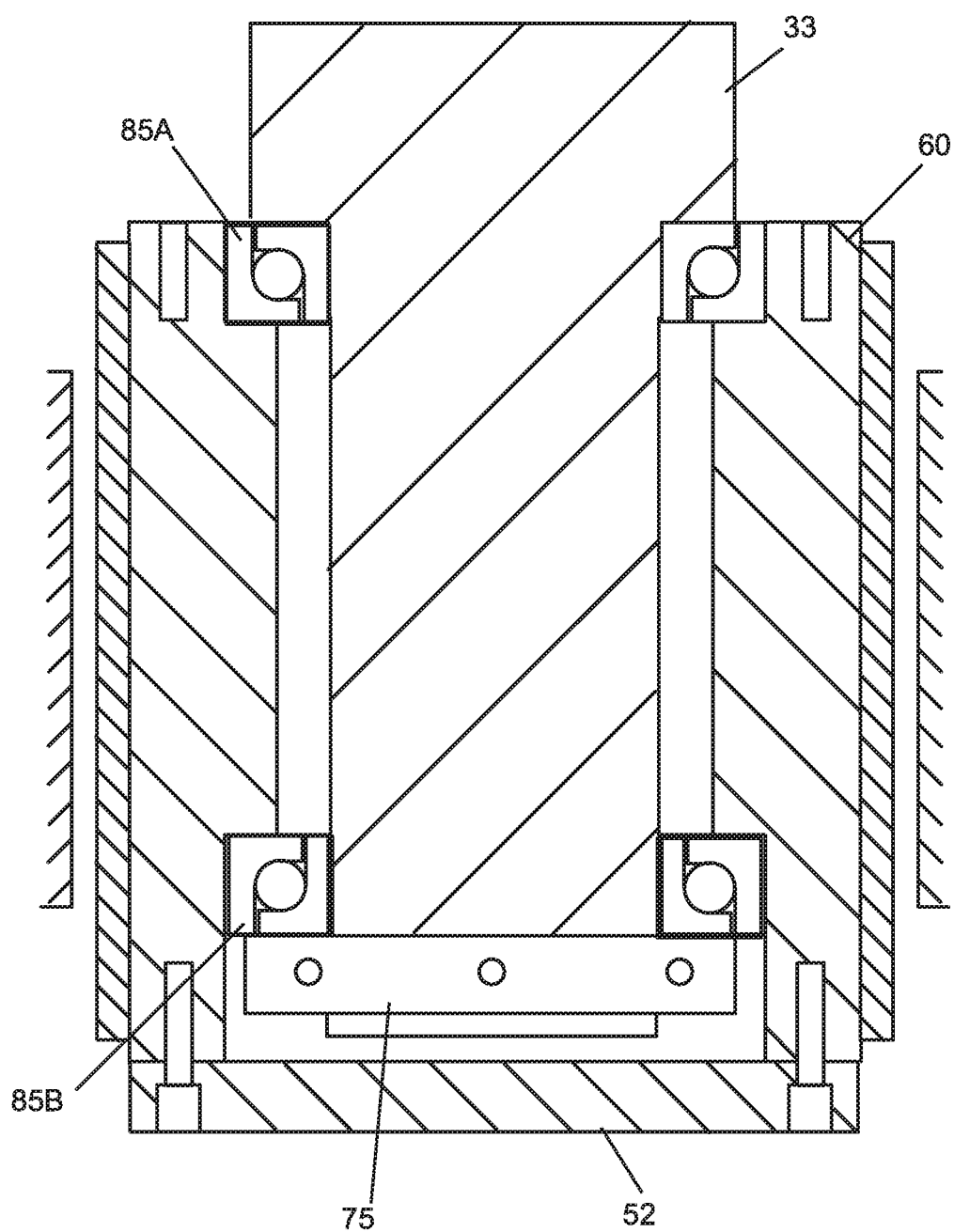
FIG. 5 is a schematic section view of a rotating component of an actuator having a second bearing configuration.
Figure 6:
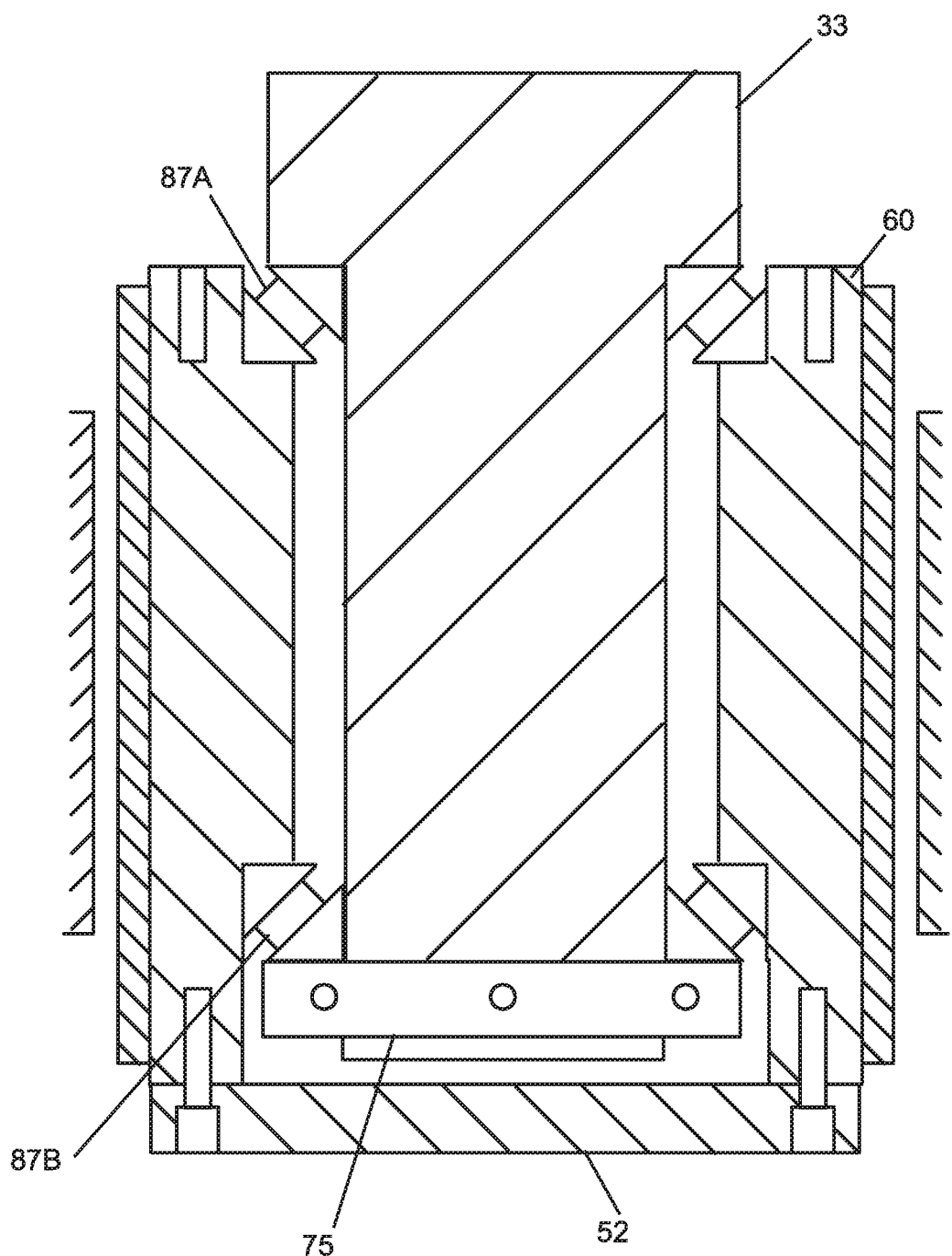
FIG. 6 is a schematic section view of a rotating component of an actuator having a third bearing configuration.

FIGS. 4, 5 and 6 schematically illustrate other bearing arrangements for the torsional motion component 27, where like reference numbers have been used for components having the same function as described above. The embodiment of FIG. 4 generally illustrates bearings 35A and 35B that allow rotation of the support 60 relative to the spindle shaft 3. Nut 75, which is secured to support shaft 33 preloads the bearings 35A and 35B. The embodiment of FIG. 5 is similar to the embodiment of FIG. 4 where bearings 85A and 8513 are angular contact bearings. The embodiment of FIG. 6 is similar to the embodiment of FIG. 4 where bearings 87A and 8713 are tapered roller bearings. These embodiments are further exemplary bearing arrangements and assemblies that can be used but should not be considered limiting. Any of these bearings can be stacked on top of one another in series for additional load carrying capacity.

Figure 7:
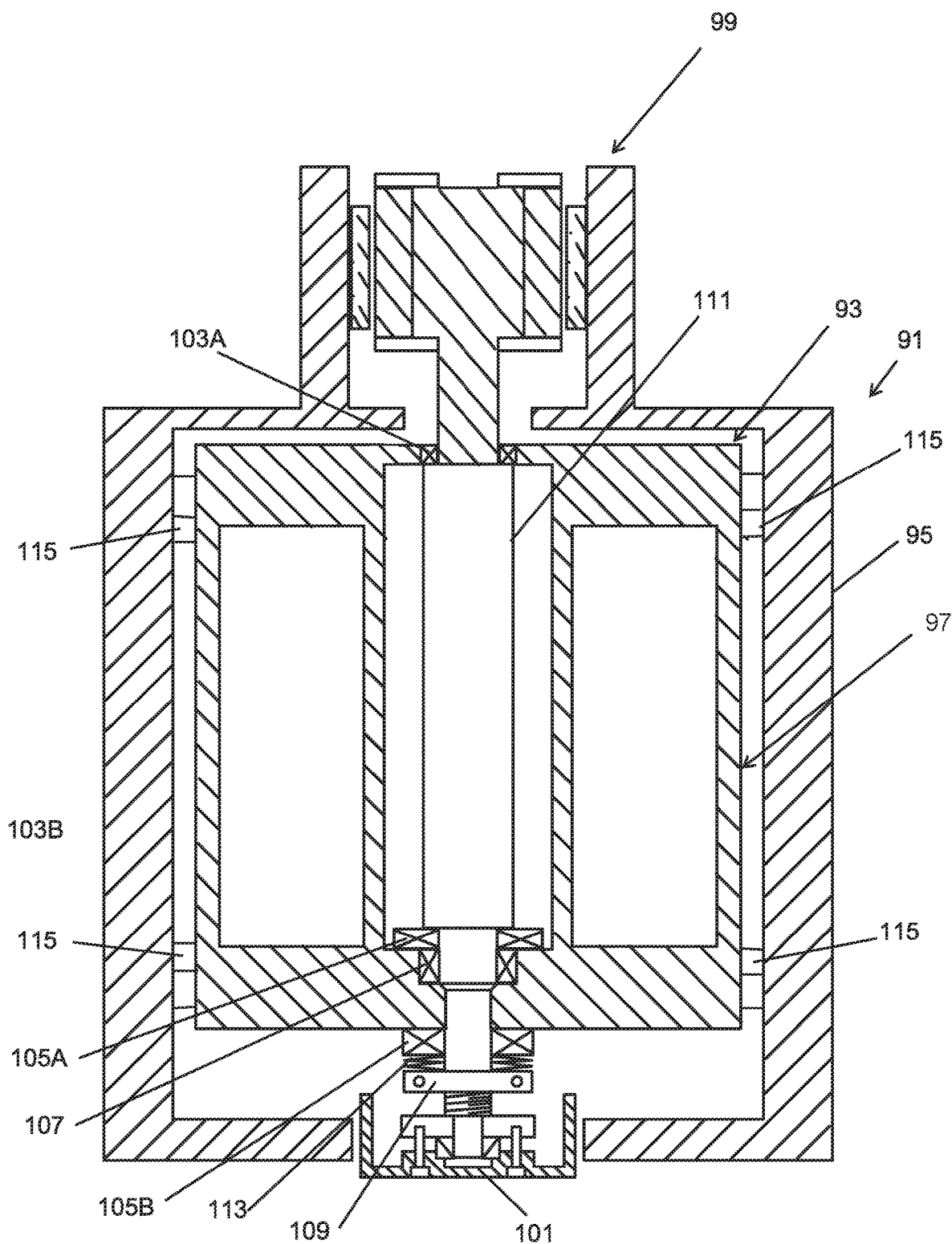
FIG. 7 is a schematic section view of a fourth actuator.
Figure 8:
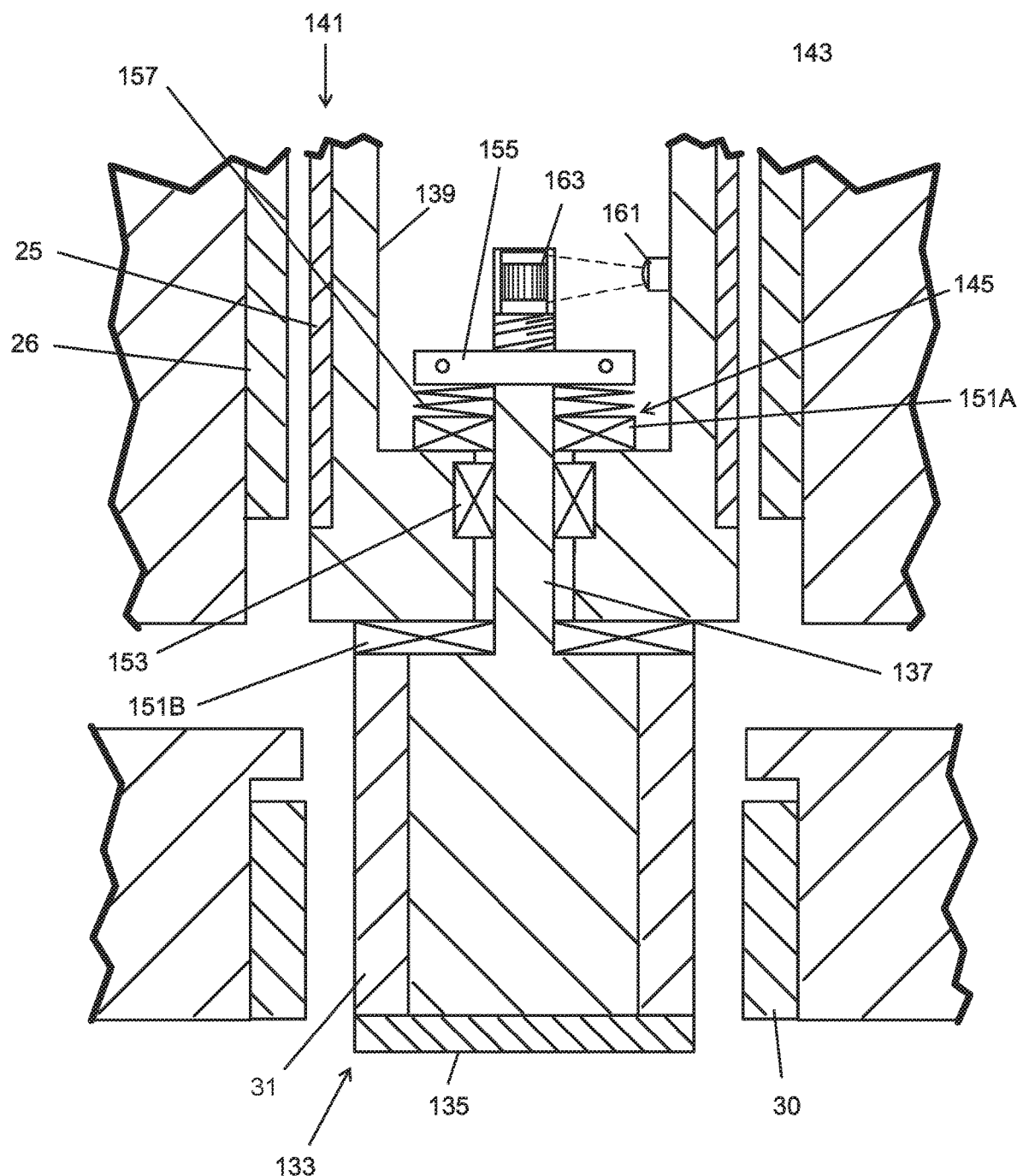
FIG. 8 is a schematic section view of a fifth actuator.

FIGS. 7 and 8 schematically illustrate other configurations of an electric actuator having a movable armature assembly capable of both linear and rotational movement. Referring first to the embodiment of FIG. 7, an electric actuator 91 includes an armature assembly 93 movable relative to a support structure 95. The electric actuator 91 includes linear motion component 97 and a rotatory or torsional motion component 99. Unlike the previous embodiments where the rotatory or torsional motion component directly supports an end member 101 used to impart loads to a test specimen or other component, the rotatory or torsional motion component 99 is mounted at an opposite end of the armature assembly 93. It should be noted that the rotatory or torsional motion component 99 is schematically shown but can include any of the features discussed above, particularly, the features described with respect to FIGS. 2A and 2B.

With the rotatory or torsional motion component 99 mounted on an end opposite end member 101, a support shaft 111 is mounted and configured to rotate within the armature assembly for the linear motion component 97. Upper bearing assembly 103A and lower bearing assembly 103B allow rotation of the support shaft 111 relative to the armature assembly for the linear motion component 97. Typically, at least one of the bearing assemblies is preloaded to sustain the maximum axial loads imparted by the actuator 91, for example, to the test specimen. In the exemplary embodiment illustrated, the lower bearing assembly 103B includes thrust bearings 105A and 105B and a radial or lateral load carrying bearing 107. A fastener 109 such as a nut threadably engages an end of the support shaft 111 and further engages spring elements 113, such as Bellevue type washers, that impart the preload force to the thrust bearings 105A and 105B. The upper bearing 103A can comprise a radial or lateral load carrying bearing allowing the support shaft 111 to rotate relative to the armature of the linear motion component 97. Linear bearings schematically illustrated at 115 guide the armature assembly 93 for linear movement relative to the support structure 95. Suitable armature and stator magnetic field generating assemblies, not shown but similar in function to that illustrated in FIG. 2A, are mounted to the armature assembly 93 and support structure 95 to provide controlled linear movement of the armature assembly 93.

Portions of another electric actuator assembly 131 is schematically illustrated in FIG. 8. In this embodiment, a rotatory or torsional motion component 133 would directly support an end member 135. Unlike the embodiment of FIG. 7 where the support shaft 111 extends completely through a bore in the armature of the linear motion component 97, a support shaft 137 extends only partially within a bore 139 in an armature 141 of a linear motion component 143. A single bearing assembly 145 allows rotation of the support shaft 137. In the exemplary embodiment illustrated, the bearing assembly 145 is similar to bearing assembly 103B and includes thrust bearings 151A and 151B and a radial or lateral load carrying bearing 153. Any of the bearing assemblies illustrated in FIGS. 4-6 could also be used. A fastener 155 such as a nut threadably engages an end of the support shaft 137 and further engages spring elements 157, such as Bellevue type washers, that impart the preload force to the thrust bearings 151A and 151B. A rotational sensor 161 optically monitors indications 163 provided on the support shaft 137 to measure rotational position thereof. Armature and stator magnetic field generating assemblies having reference numbers identified in FIG. 2A are also indicated.

Figure 9:
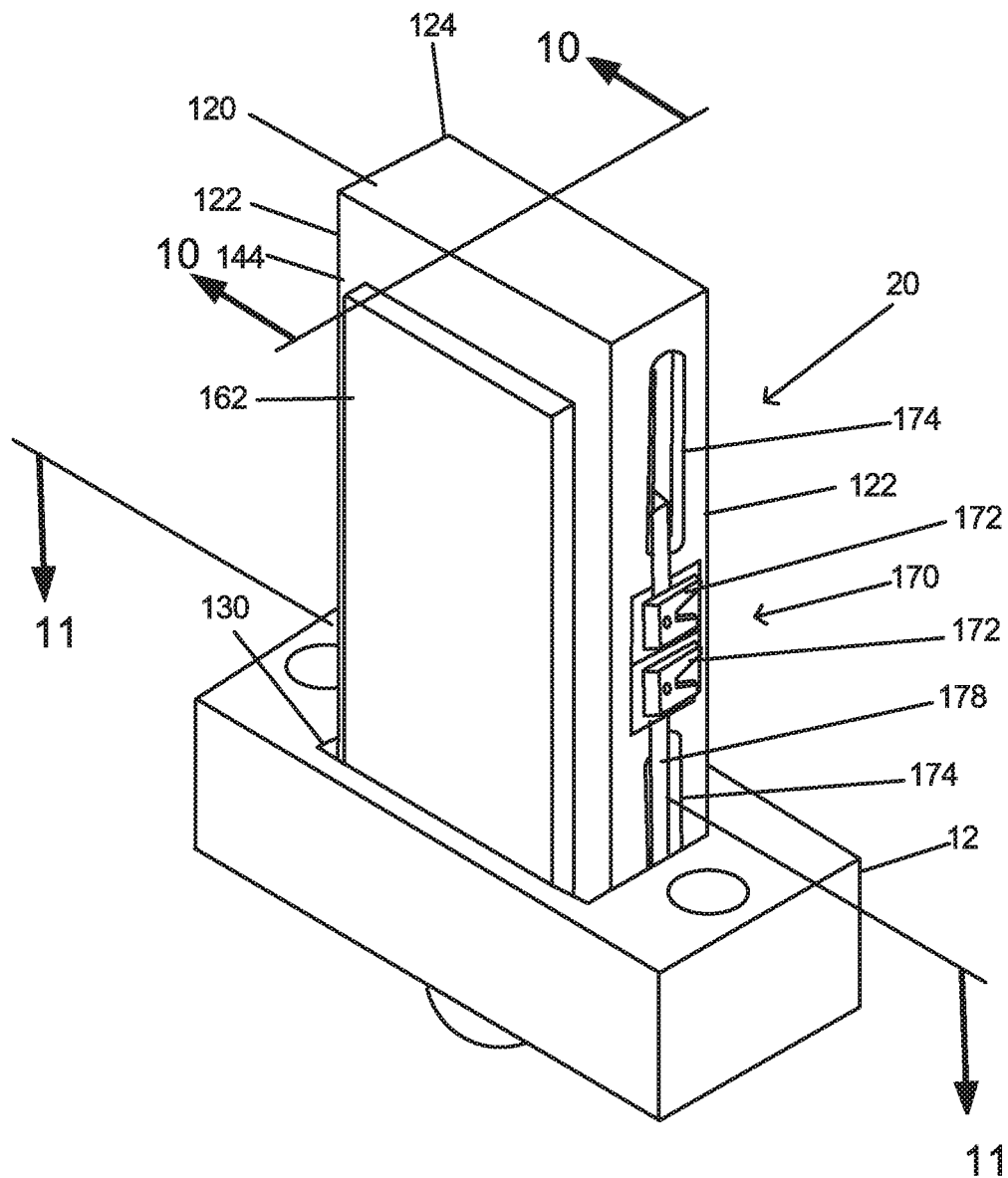
FIG. 9 is a schematic perspective view of the actuator of FIG. 1.
Figure 10:
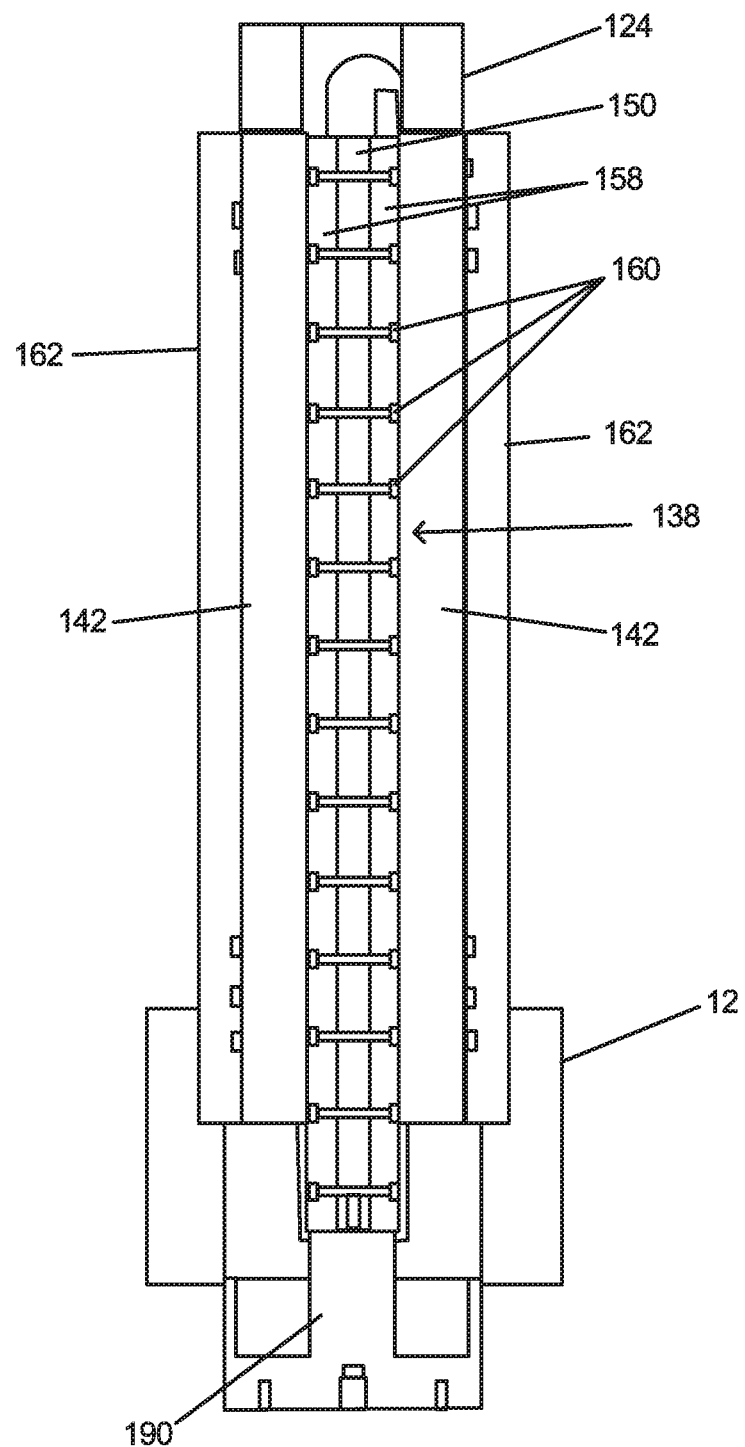
FIG. 10 is a schematic section view of the actuator of FIG. 9 taken along an axis parallel to a longitudinal axis of the actuator.
Figure 11:
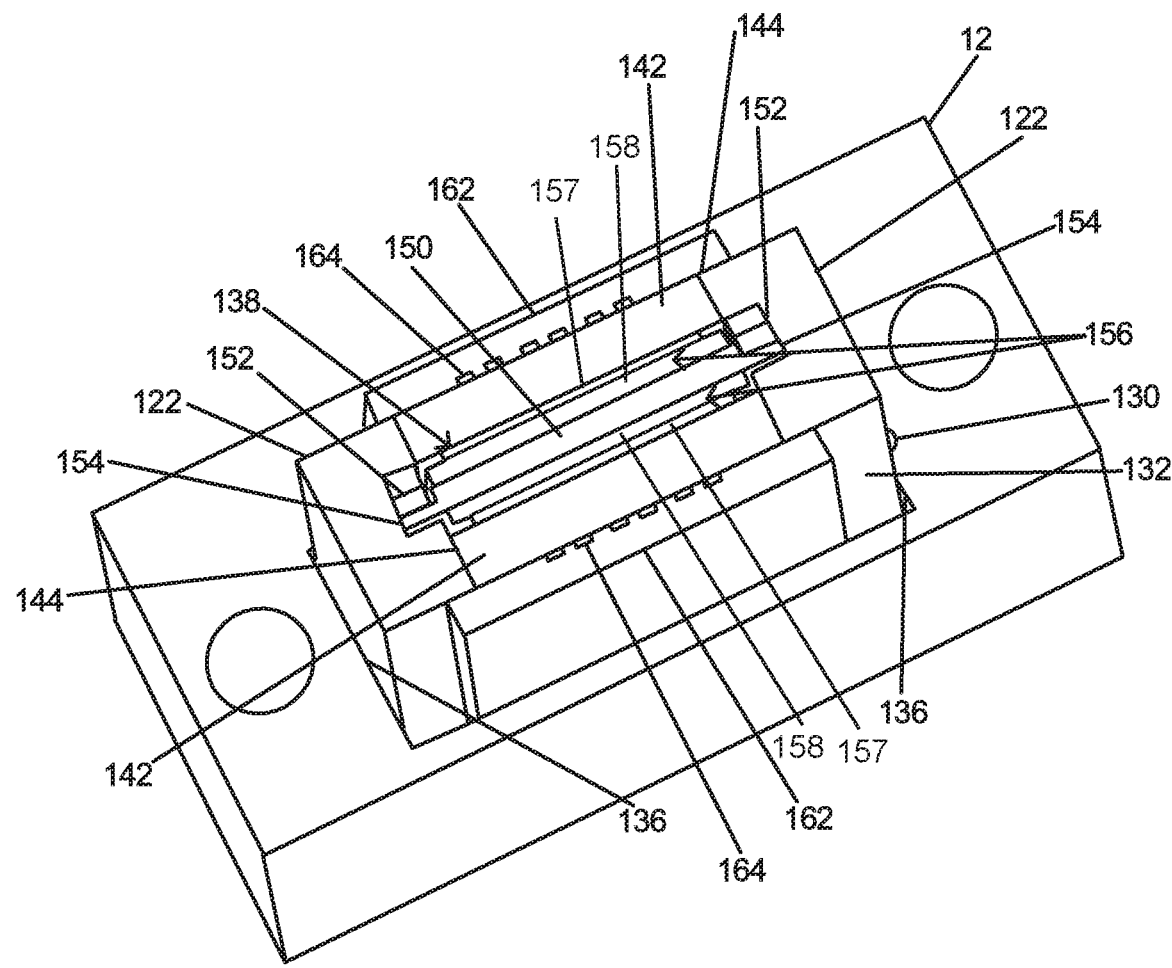
FIG. 11 is a schematic section view of the actuator of FIG. 9 taken along an axis perpendicular to a longitudinal axis of the actuator.

Referring to FIGS. 9, 10 and 11 the electric actuator 20 includes a support structure 120 that includes opposed side rails 122 and an upper cross member 124 joining ends of the side rails 122 together. The side rails 122 and cross member 124 can comprise separate elements fastened together with fasteners or welding. In a further embodiment, the side rails 122 and cross member 124 are integrally formed together from a single unitary body. Ends of the side rails 122 opposite the cross member 124 are joined to the crosshead 12. In a preferred embodiment, the crosshead 12 includes a recess 130 into which the side rails 122 extend, being mounted to a lower surface 132 of the recess 130. In this manner, the overall height of the assembly can be reduced.

Referring to FIGS. 10 and 11, the armature assembly 22 of the electric actuator 20 comprises a plate assembly 138 having major surfaces comprising magnets and planar stator winding assemblies 142. The stator winding assemblies 142 are mounted to the support structure 120, in a preferred embodiment, in an aperture 144 defined by the opposed side rails 122, cross member 124 and crosshead 12 on each side of the plate assembly 138.

The plate assembly 138 includes a center support plate 150 preferably made of a light weight material such as aluminum. Linear bearings 152 couple side flanges 154 of the center support plate 150 to the side rails 122 so as to provide guided linear movement of the plate assembly 138 with respect to the side rails 122. Magnetic assemblies 156 are fastened to opposite sides of the center support plate 150. Each magnetic assembly 156 includes a back plate 158 where magnets (not shown) are bonded thereto. Fasteners 160 secure each of the back plates 158 to the center support plate 150. If needed, cooling plates 162 having internal channels 164 for cooling fluid can be secured on each side of the support structure 120 and placed at least proximate to each of the stator winding assemblies 142 to remove heat therefrom.

The structure of the plate assembly 138 is particularly advantageous. In general, the structure is a "sandwich" structure comprising the center support plate 150 and the magnet backing plates 158 mounted on opposite sides of the center support plate 150. Generally, it is important that the plate assembly 138 be very stiff. The center support plate 150 being made of relatively light weight material such as aluminum, which is not very stiff in bending, but due to the magnet backing plates 158 mounted thereto on opposite sides, the whole structure becomes very stiff because of the geometry.

To prevent uncontrolled movement of the armature assembly 22 when power is interrupted, a braking assembly 170 (FIG. 9) is configured to arrest or stop movement of the armature assembly 22 in the event of power loss. The braking assembly 170 includes at least one caliper assembly 172 having spaced apart plates that form a gap therebetween when power is supplied to the electric actuator 20. In the embodiment illustrated, two caliper assemblies 172 are provided. Each caliper assembly 172 is secured to the support structure 120 such as to one of the side rails 122 herein between apertures 174 provided in the side rail 122. A brake band 178 is coupled at opposite ends to the center support plate 150 where mounting brackets for the ends of the brake band 178 extends through the apertures 174. The brake band 178 is attached to the center support plate 150 such that the brake band 178 is substantially vertical and is located substantially parallel to the linear motion of the armature assembly 22.

As the armature assembly 22 moves along linearly, the brake band 178 also moves in a parallel path. Because the brake band 178 does not contact the caliper plates while power is supplied to the electric actuator 20, the caliber plates provide no resistance to the brake band 178 when power is supplied to the electric actuator 20. However, when power is interrupted, the caliber assemblies 172 cause the plates thereof to move toward each other. As the plates move toward each other, the plates frictionally engage the brake band 178 and therefore prevent further movement of the armature assembly 22.

Figure 12:
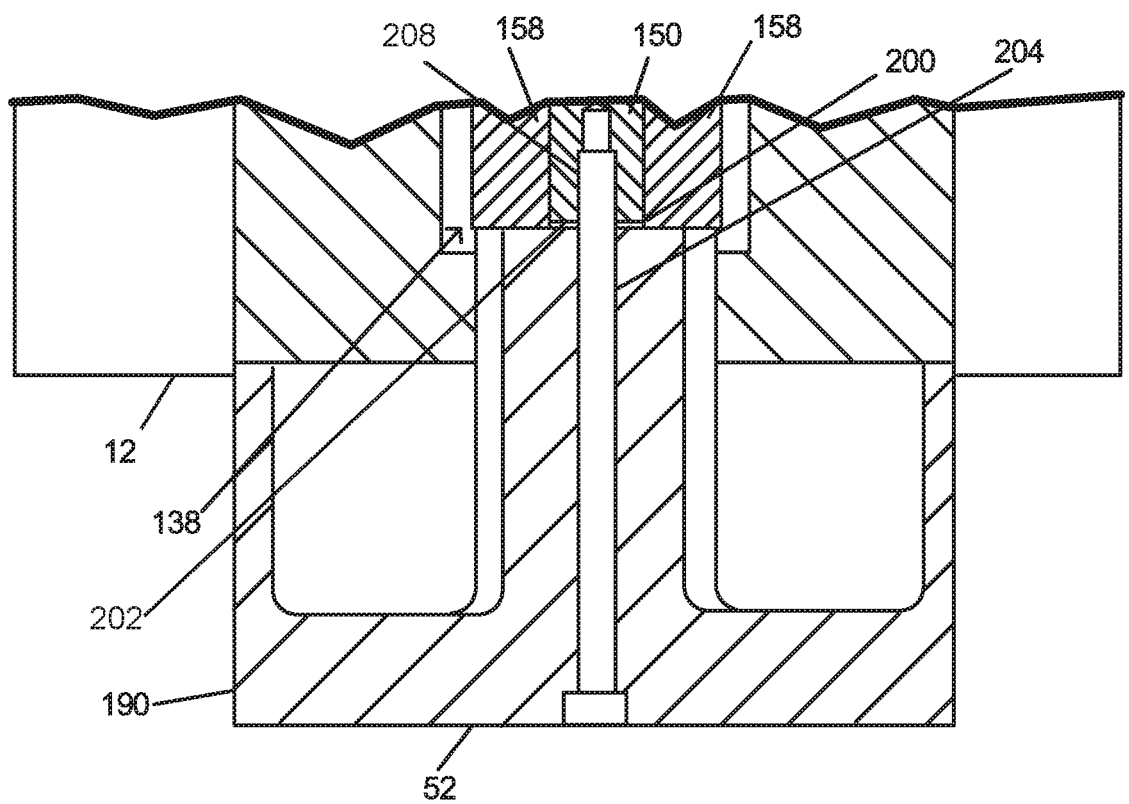
FIG. 12 is a schematic section view of an end of an actuator.

It should be noted that the rotational or torsional motion component 27 of the electric actuator 20 need not always be required. Rather, an electric actuator having only the linear motion component 25 may be desired in some applications. In such an embodiment, construction of the linear motion component 25 can include the structure discussed above. Since a rotational or torsional motion component is not present in such an embodiment, the support shaft 33 comprises a standoff 190 as illustrated in FIG. 10. The end member 52 is fastened to or formed integral with from a single unitary body an end of the standoff 190 using suitable fasteners. Preferably, the standoff 190 is mounted to the plate assembly 138 so as not to have any back lash, or stated another way, the standoff 190 is pre-loaded when mounted to the plate assembly 138. However, instead of mounting the standoff 190 directly to the center support plate 150 such that the center support plate 150 carries the axial load, instead the standoff 190 engages end surfaces of the back plates 158 so as to react the axial load directly to the armature components having the magnets. As illustrated in FIG. 12, a space 200 is provided between an end of the standoff 190 and an end surface 202 of the center support plate 150. A suitable fastener 204 mounts the standoff 190 to the center support plate 150 such as with a bolt extending upwardly in the standoff 190 that engages a threaded aperture 208 provided in the center support plate 150. The bolt 204 is tightened until a desired preload force, greater than the axial force to be exerted by the actuator 20 in operation, is achieved.

It should be noted in a manner similar to mounting of the standoff 190 to the center support plate 150 as discussed above, this technique can also be used to mount the support shaft 33 of the rotational and torsional component 27 so as to engage the back plates 158 rather than the center support plate 150. Again, space 200 is provided between an end surface of the support shaft 33 and an end surface of the center support plate 150. Suitable fasteners are used to secure the support shaft 33 to the center support plate 150. In one embodiment, two bolts are provided. The bolts are disposed on opposite sides of the axis of rotation and extend upwardly to engage threaded apertures in the center support plate 150.

Although the present invention has been described with reference to preferred embodiments, workers skilled in the art will recognize that changes may be made in form and detail without departing from the spirit and scope of the invention.

What is claimed is:

1. An electric actuator assembly comprising:
    a support housing;
    a first stator magnetic field generating assembly secured to the support housing;
    a second stator magnetic field generating assembly secured to the support housing;
    a movable armature assembly comprising:
        a center support;
        a first armature magnetic field generating assembly secured to the center support to move linearly therewith and configured to provide magnetic fields operative with the first stator magnetic field generating assembly to provide linear motion of the movable armature assembly along a reference axis;
        bearings secured to the center support to move linearly therewith; and
        a second armature magnetic field generating assembly coupled to the center support with the bearings to move linearly therewith and configured to provide magnetic fields operative with the second stator magnetic field generating assembly to provide rotational motion of the second armature magnetic field generating assembly about the center support, the second armature magnetic field generating assembly being one of longer or shorter longitudinally with respect to the reference axis than the second stator magnetic field generating assembly such that the second armature magnetic field generating assembly and the second stator magnetic field generating assembly are operatively coupled for linear motion of the center support and the second armature magnetic field generating assembly.

2. The electric actuator assembly of claim 1 wherein the first stator magnetic field generating assembly comprises windings.

3. The electric actuator assembly of claim 1 wherein the first armature magnetic field generating assembly comprises permanent magnets.

4. The electric actuator assembly of claim 1 wherein the second stator magnetic field generating assembly comprises windings.

5. The electric actuator assembly of claim 1 wherein the second armature magnetic field generating assembly comprises windings.

6. The electric actuator assembly of claim 1 wherein the first armature magnetic field generating assembly has a cylindrical shape.

7. The electric actuator assembly of claim 1 wherein the bearings comprise a thrust bearing spaced apart from an additional bearing configured to react lateral loads.

8. The electric actuator assembly of claim 1 wherein the bearings comprise an angular contact bearing.

9. The electric actuator assembly of claim 1 wherein the bearings comprise a tapered bearing.

10. The electric actuator assembly of claim 1 wherein the center support extends at least partially into the first armature magnetic field generating assembly.

11. The electric actuator assembly of claim 1 wherein the center support extends within a bore extending along a longitudinal length of the first armature magnetic field generating assembly.

12. The electric actuator assembly of claim 1 wherein the first armature magnetic field generating assembly comprises first and second magnetic assemblies secured to opposite sides of the center support.

13. A The electric actuator assembly of claim 12 wherein the center support is made of material softer than the first and second magnetic assemblies.

14. The electric actuator assembly of claim 13 wherein the second armature magnetic field generating assembly is secured to the center support with a fastener.

15. The electric actuator assembly of claim 1 wherein the first armature magnetic field generating assembly is longer longitudinally with respect to the reference axis than the second stator magnetic field generating assembly.

16. The electric actuator assembly of claim 1 wherein the first armature magnetic field generating assembly is shorter longitudinally with respect to the reference axis than the second stator magnetic field generating assembly.

17. The electric actuator assembly of claim 1 wherein the first armature magnetic field generating assembly is planar.

* * * * *